US006092822A

United States Patent [19]

Salmon

[11] Patent Number: 6,092,822

[45] Date of Patent: Jul. 25, 2000

[54] SELF-PROPELLED WHEELCHAIR

[75] Inventor: Jim Roger Salmon, Fresno, Calif.

[73] Assignee: Jim Roger Salmon and Chris Phillip Berryhill, A California Partnership, Fresno, Calif.

[21] Appl. No.: 09/189,472

[22] Filed: Nov. 10, 1998

[51] Int. Cl.[7] .......... B62M 1/14

[52] U.S. Cl. .......... 280/261; 280/250.1; 280/304.1; 280/270; 297/DIG. 4

[58] Field of Search .......... 280/250.1, 304.1, 280/259, 261, 270, 278; 482/57; 297/DIG. 4

[56] References Cited

U.S. PATENT DOCUMENTS

| | | | |
|---|---|---|---|
| 3,381,973 | 5/1968 | Carr | 280/250.1 X |
| 3,953,054 | 4/1976 | Udden et al. . | |
| 4,371,183 | 2/1983 | Dion . | |
| 4,537,415 | 8/1985 | Delahoussaye et al. . | |
| 4,560,033 | 12/1985 | DeWoody et al. | 280/304.1 |
| 4,570,756 | 2/1986 | Minnebraker et al. | 280/304.1 |
| 4,572,501 | 2/1986 | Durham et al. | 280/250.1 X |
| 4,586,723 | 5/1986 | Nabinger . | |
| 4,592,570 | 6/1986 | Nassiri . | |
| 4,811,964 | 3/1989 | Horn | 280/250.1 |
| 4,865,344 | 9/1989 | Romer, Sr. et al. | 280/304.1 X |
| 4,892,323 | 1/1990 | Oxford | 280/304.1 X |
| 5,020,815 | 6/1991 | Harris et al. . | |
| 5,152,543 | 10/1992 | Sims et al. | 280/250.1 |
| 5,174,418 | 12/1992 | Le et al. . | |
| 5,242,179 | 9/1993 | Beddome et al. | 280/304.1 |
| 5,244,222 | 9/1993 | Benoit | 280/250.1 |
| 5,244,223 | 9/1993 | Uchiyama . | |
| 5,280,937 | 1/1994 | Needham . | |
| 5,322,312 | 6/1994 | Cammack | 280/304.1 |
| 5,324,060 | 6/1994 | Van Vooren et al. | 280/304.1 |
| 5,382,036 | 1/1995 | Counts et al. | 280/304.1 |

FOREIGN PATENT DOCUMENTS

| | | | |
|---|---|---|---|
| 0384499 | 4/1990 | European Pat. Off. | 280/304.1 |
| 3007497 | 4/1981 | Germany | 280/304.1 |

*Primary Examiner*—J. J. Swann
*Assistant Examiner*—F. Zeender
*Attorney, Agent, or Firm*—Thomas R. Lampe

[57] ABSTRACT

A wheelchair includes a support frame and wheels and casters rotatably connected to the support frame. A rotatable steering member is slidably connected to a caster swivel support frame for steering the wheelchair. The wheelchair also includes a collapsible seat frame as well as a pedal operated transmission to drive the wheels of the wheelchair. A single brake lever brings two brake elements into engagement with the wheels to lock the wheelchair against rolling movement.

19 Claims, 7 Drawing Sheets

SELF-PROPELLED WHEELCHAIR

TECHNICAL FIELD

This invention relates to a wheelchair and more particularly to a wheelchair that may be self-propelled by a person in the chair or pushed by another person.

BACKGROUND OF THE INVENTION

Many types of wheelchairs are known in the prior art. Conventional wheelchairs are propelled by either a person pushing the wheelchair to transport the chair's occupant or by the occupant himself or herself, typically by grasping the main wheels of the chair to turn them. Of course, it is also known to provide wheelchairs with an auxiliary propulsion system such as a battery powered electric motor. Wheelchairs have also been proposed wherein the person in the chair can propel the chair by pushing foot pedals associated therewith or by pushing or pulling hand powered mechanisms.

The following patents are believed to be generally representative of the current state of the prior art relating to wheelchairs: U.S. Pat. No. 5,280,937, issued Jan. 25, 1994, U.S. Pat. No. 4,537,415, issued Aug. 27, 1985, U.S. Pat. No. 5,174,418, issued Dec. 29, 1992, U.S. Pat. No. 4,371,183, issued Feb. 1, 1983, U.S. Pat. No. 5,244,223, issued Sep. 14, 1993, U.S. Pat. No. 4,592,570, issued Jun. 3, 1986, U.S. Pat. No. 3,953,054, issued Apr. 27, 1976, U.S. Pat. No. 4,586,723, issued May 6, 1986, and U.S. Pat. No. 5,020,815, issued Jun. 4, 1991.

DISCLOSURE OF INVENTION

This invention relates to a wheelchair which is characterized by its relative simplicity, ease of use and versatility as compared to conventional prior art wheelchair constructions. The wheelchair incorporates a number of structural features which also greatly add to the convenience of use of the chair.

The wheelchair of the present invention includes a support frame having a support frame front end and a support frame back end.

First and second drive wheels are rotatably mounted on the support frame at the support frame back end, the first and second drive wheels being disposed on opposed sides of the support frame.

Pedal means are mounted on the support frame at the support frame front end and transmission means is operatively associated with the pedal means and the drive wheels for rotating the drive wheels to propel the wheelchair in response to movement of the pedal means by a user of the wheelchair.

The wheelchair also incorporates caster mounting means connected to the support frame. First and second caster swivel frames are rotatably connected to the caster mounting means. The first and second caster swivel frames are disposed on opposed sides of the support frame and each is rotatable three hundred sixty degrees about a vertical axis of rotation relative thereto.

First and second caster wheels are rotatably mounted on the first caster swivel frame and the second caster swivel frame about horizontal axis.

A steering member is rotatably mounted relative to the caster mounting means and connected to the first caster swivel frame to steer the first caster swivel frame along with the caster wheel rotatably mounted thereon when a force is applied to the steering member by the user. The steering member is freely rotatable three hundred sixty degrees with the first caster swivel frame when a force is not being applied to the steering member by the user.

Other features, advantages, and objects of the present: invention will become apparent with reference to the following description and accompanying drawings.

MODES FOR CARRYING OUT THE INVENTION

Figure 2:
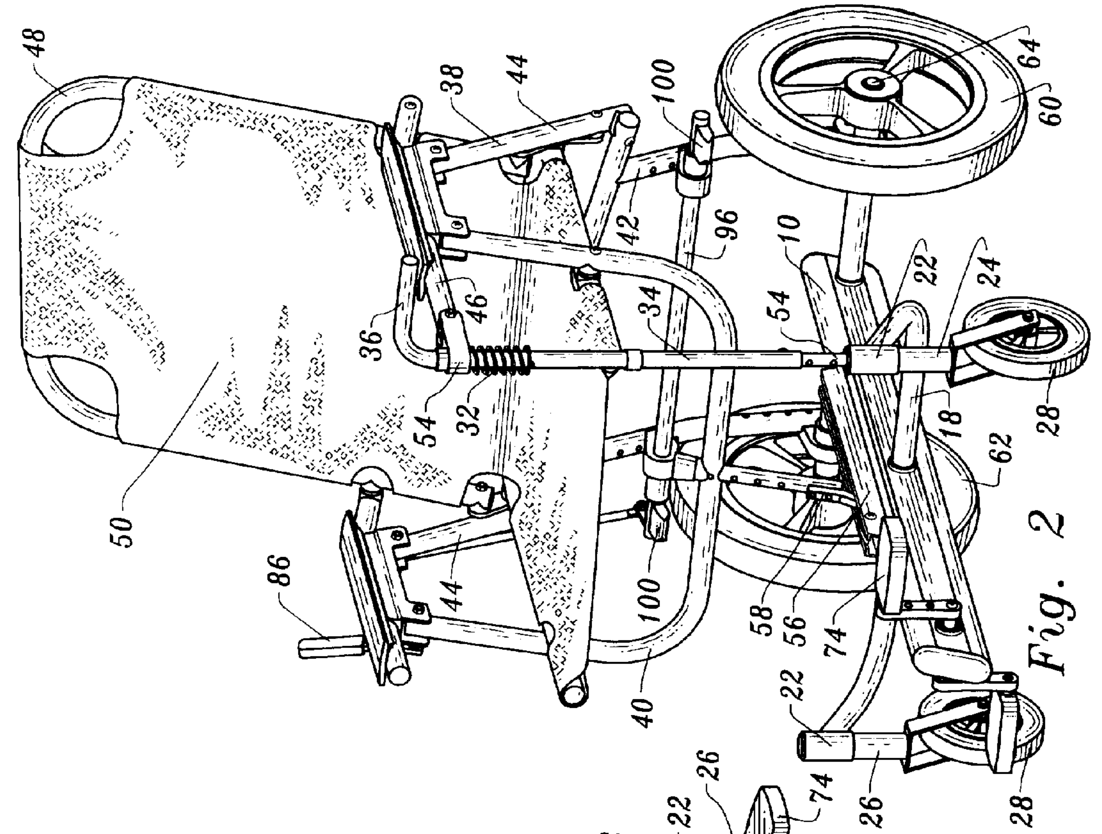
FIG. 2 is a frontal perspective view of the wheelchair.
Figure 1:
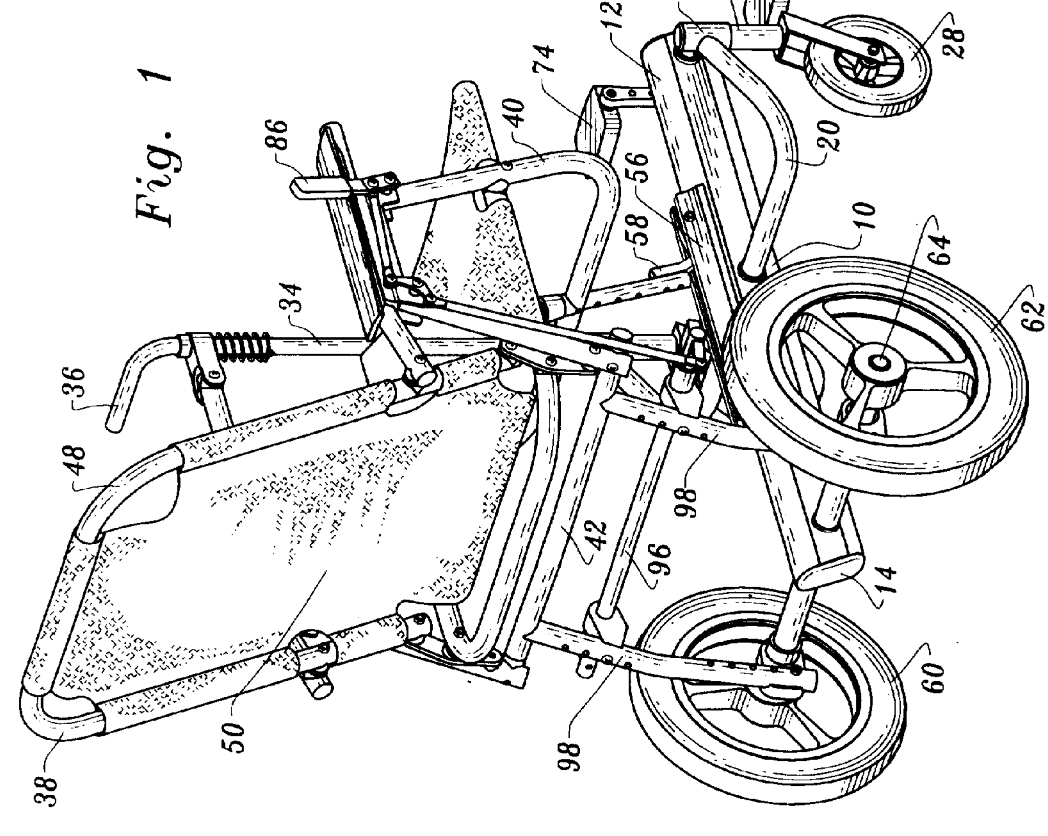
FIG. 1 is a rear perspective view illustrating a wheelchair constructed in accordance with the teachings of the present invention.
Figure 4:
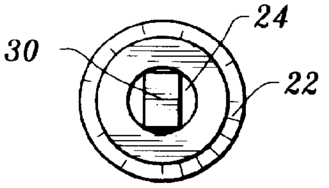
FIG. 4 is a greatly enlarged view taken along the line 4—4 in FIG. 3.

Referring now to FIGS. 1–14 a wheelchair constructed in accordance with the teachings of the present invention includes a support frame 10 having a front end 12 and a back end 14. The support frame is in the form of a housing defining an interior 16 (see FIG. 14).

Attached to support frame 10 and projecting outwardly from opposed sides of the support frame between the front and back ends thereof are caster mounting members 18, 20 which curve and project forwardly at the distal ends thereof as shown in the drawings. The caster mounting members can function as foot rests engageable by the feet of a person using the wheelchair when desired without interfering with action of wheelchair pedals which will be described below.

The distal ends of the caster mounting members are in the form of cylinders 22 which receive the top ends of caster swivel frames 24, 26, the caster swivel frames each having a caster wheel 28 rotatably mounted therein. The caster swivel frames and caster wheels operatively associated therewith are freely rotatable three hundred sixty degrees about a vertical axis of rotation, the caster wheels of course being rotatable relative to the caster swivel frames about horizontal axes. Suitable bearings, not shown, may be utilized in the construction to facilitate rotational movement of the caster swivel frames and caster wheels.

The shaft-like portion of caster swivel frame 24 located in cylinder 22 of caster mounting member 18 has an elongated opening or socket 30 (see FIG. 4) formed therein. Such opening, which is rectangular-shaped in the illustrated embodiment, is for receiving the distal end 32 of corresponding configuration of the elongated portion of a steering member 34.

Figure 11:
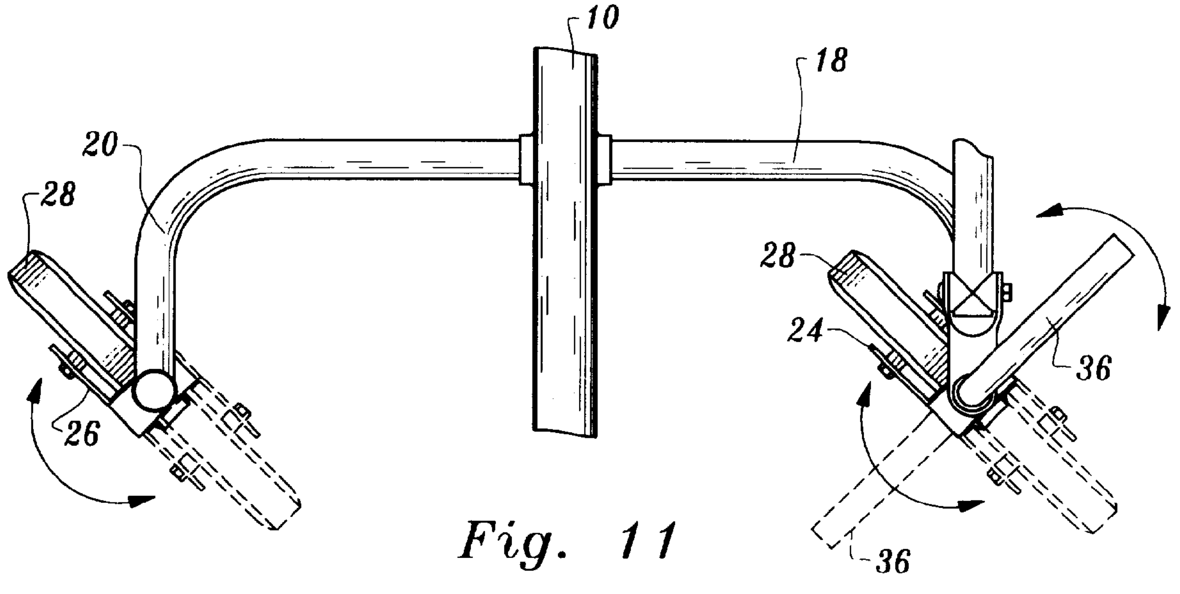
FIG. 11 is a top plan view of a portion of the wheelchair including casters, caster swivel frames and steering member.

Steering member 34 has a handle 36 at the upper end thereof. When the distal end 32 of the steering member is positioned in opening 30, rotation of the steering member through manipulation of the handle will result in steering of the associated connected caster swivel frame and caster wheel. This is shown in FIG. 11 wherein the handle and caster swivel frame 24 along with its associated caster wheel 28 are depicted in two different positions by solid lines and dash lines.

Rotation of caster swivel frame 24 with its associated caster wheel will cause a corresponding change in direction of caster swivel frame 26 and its associated caster wheel 28, particularly during movement of the wheelchair. Of course, movement of the caster swivel frames and associated caster wheels caused by some other action such as pushing of the wheelchair will cause corresponding rotation of the steering member 34. In other words, the steering member 34 is freely rotatable three hundred and sixty degrees so as not to impede rotational movement of the caster swivel frames and caster wheels when the user of the chair is not exerting a force on the steering member.

Figure 5:
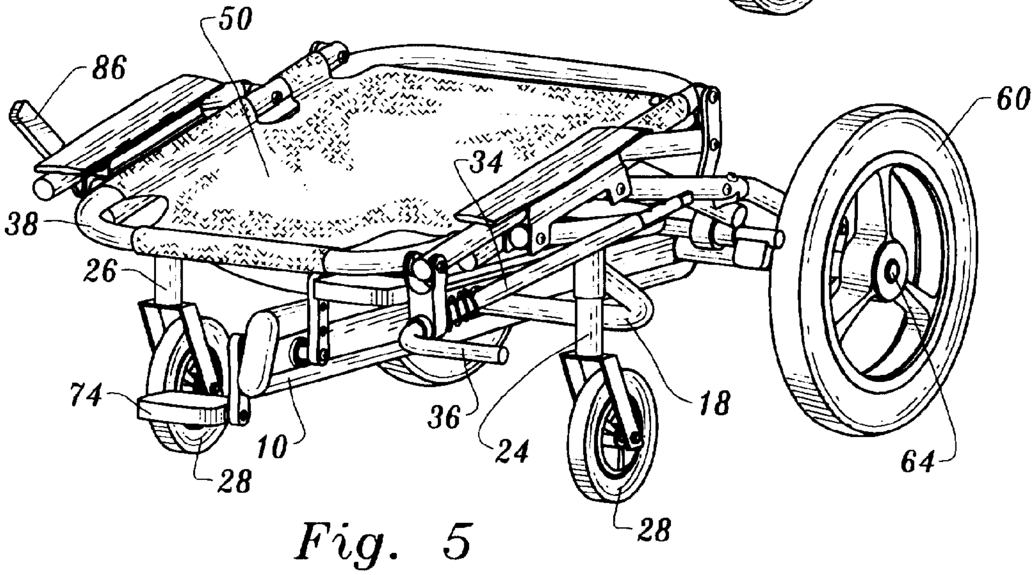
FIG. 5 illustrates the wheelchair in perspective in a collapsed condition.
Figure 6:
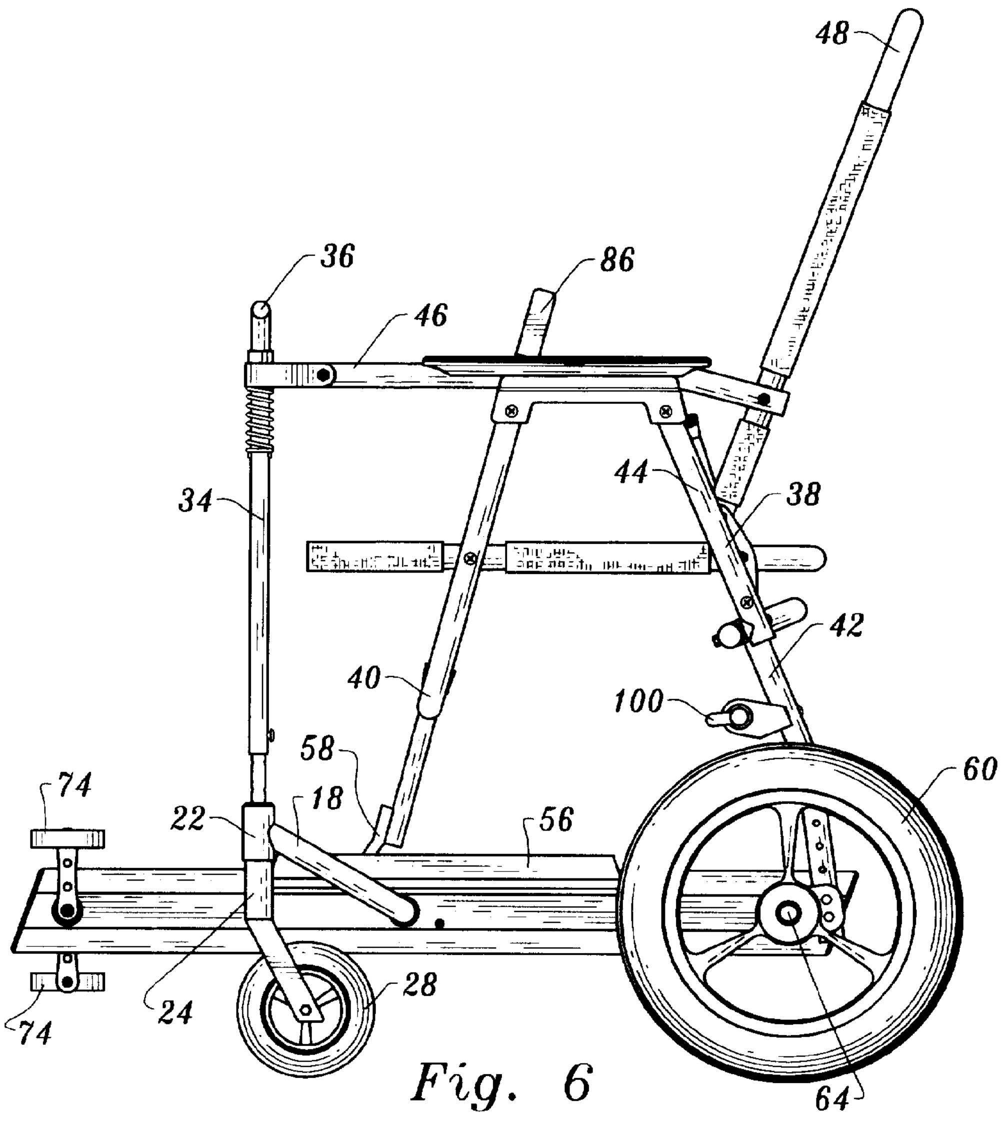
FIG. 6 is a side elevational view of the wheelchair with the illustrated structural elements thereof being in the relative positions assumed thereby when the wheelchair is being used.
Figure 7:
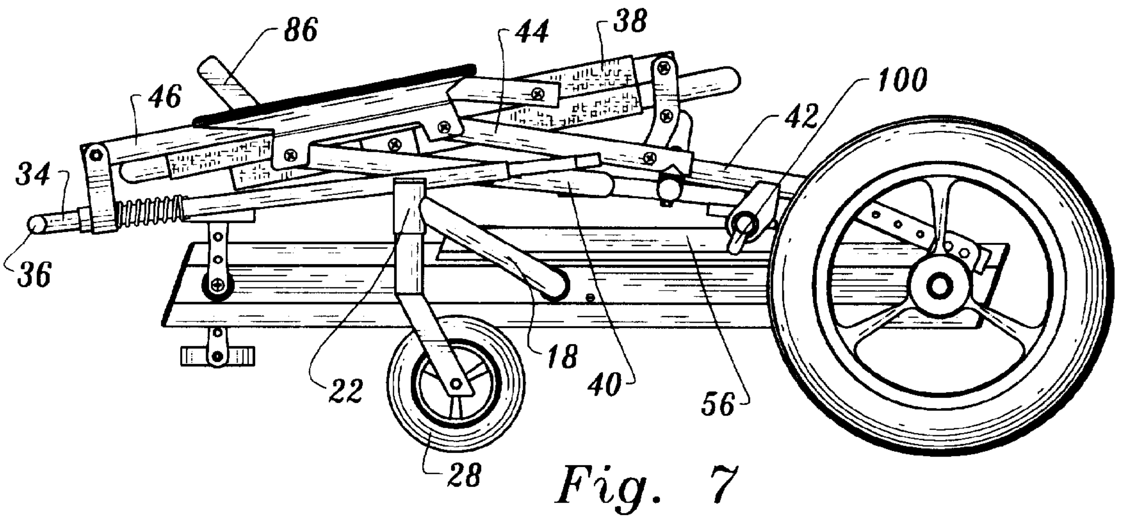
FIG. 7 is a view similar to FIG. 6 but illustrating the wheelchair in a collapsed condition.
Figure 8:
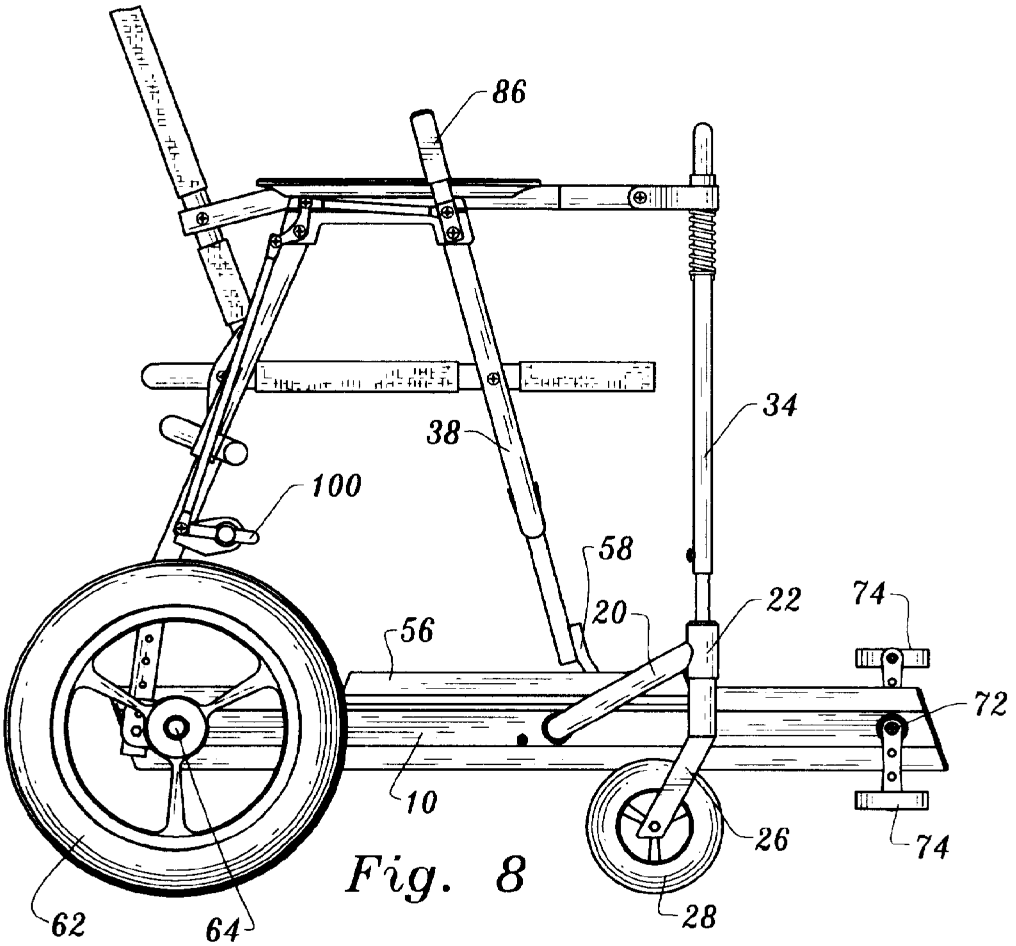
FIG. 8 is a side elevational view of the uncollapsed wheelchair taken from the side thereof opposite to that illustrated in FIG. 6.
Figure 9:
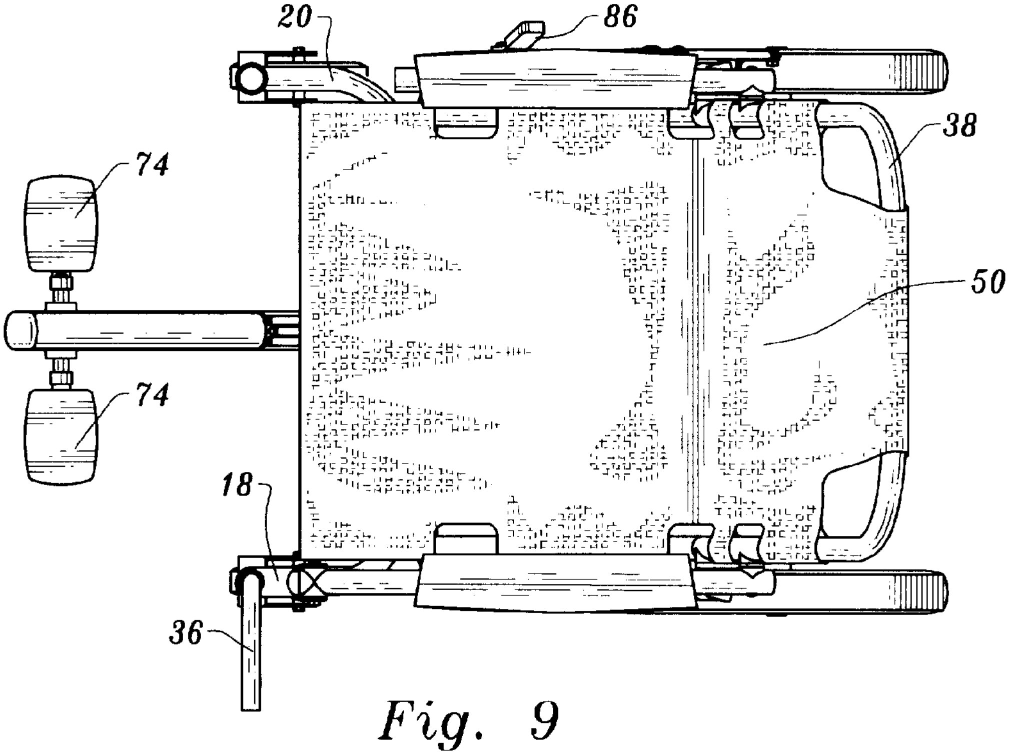
FIG. 9 is a top plan view of the wheelchair.
Figure 10:
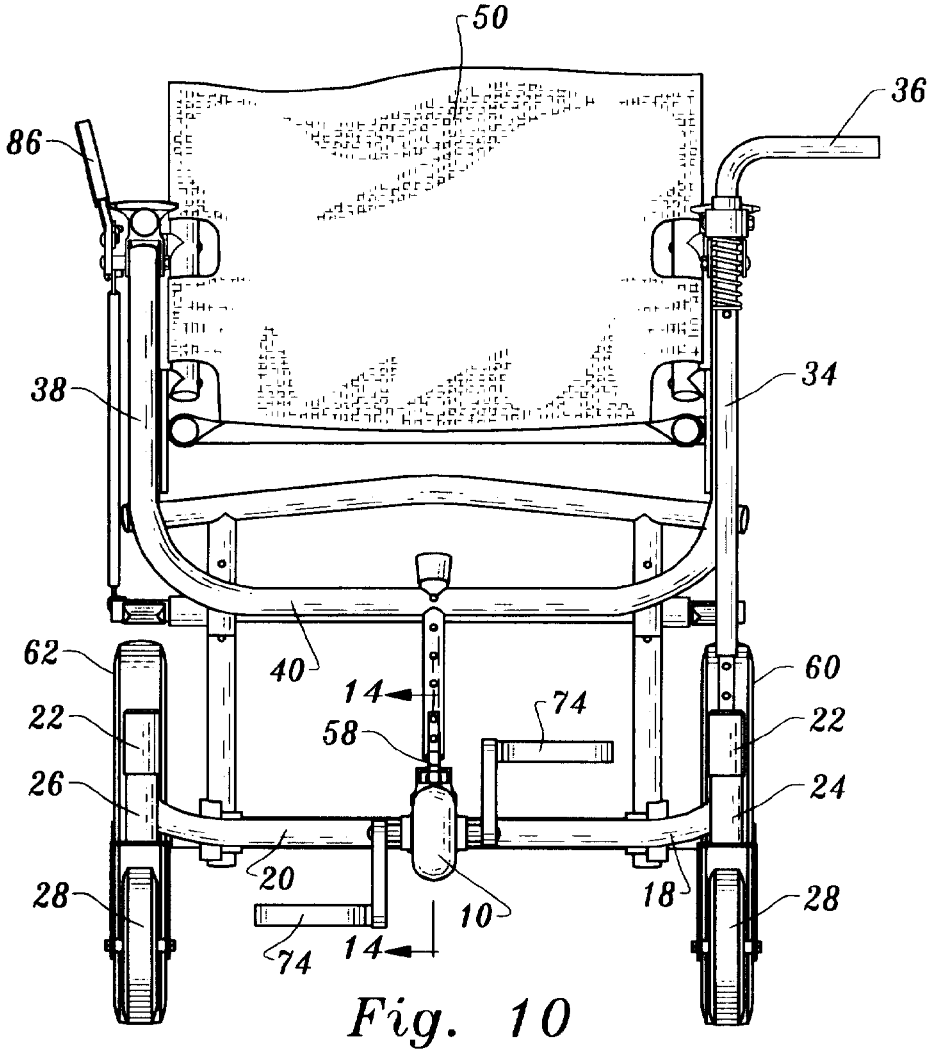
FIG. 10 is a front view of the wheelchair.

The upper end of the steering member 24 is pivotally connected to a collapsible seat frame 38 which is comprised of a plurality of hingedly connected seat frame members including seat frame members 40, 42, 44, 46 and 48. A seat 50 formed of fabric or the like is supported by the seat frame. FIGS. 1, 2, 6 and 8 illustrate the seat frame in the uncollapsed position it assumes when the wheelchair is in use. FIGS. 5 and 7 show the wheelchair in collapsed condition, for example during transport or storage of the wheelchair.

Figure 3:
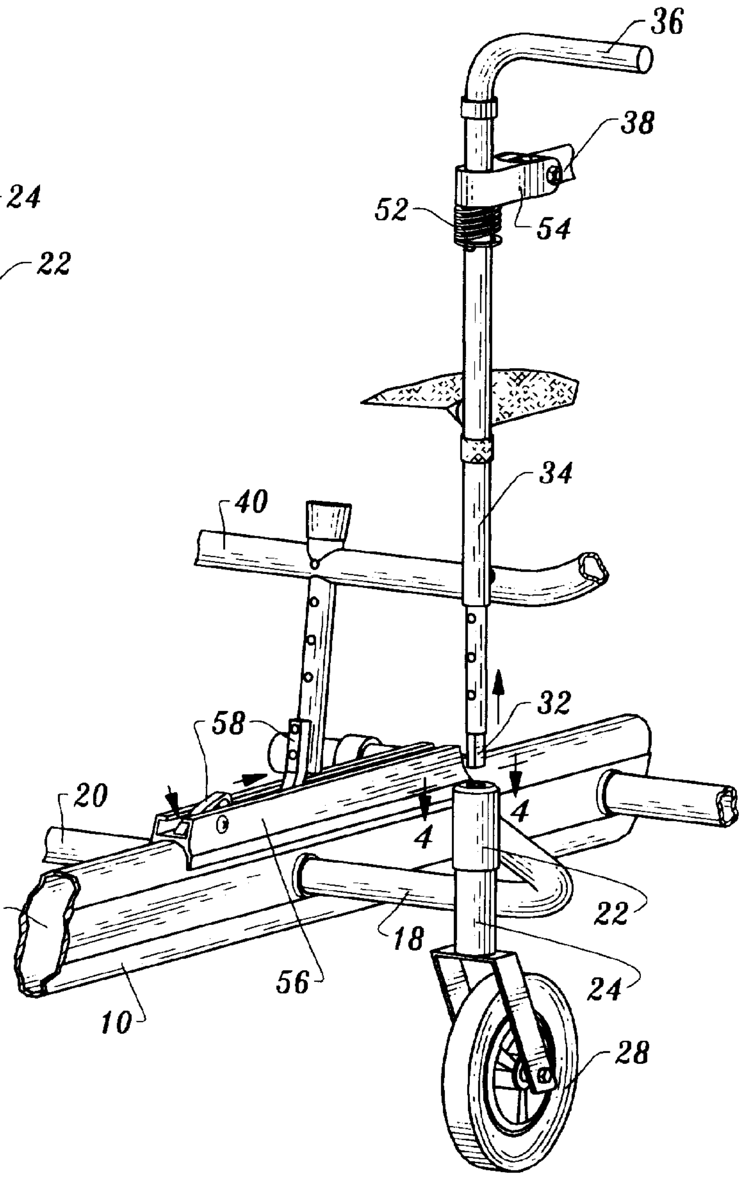
FIG. 3 is a perspective view illustrating selected components of the wheelchair including a caster and a steering member of the wheelchair being disengaged from operative association with the caster.

Steering member 34 is slidably mounted in opening or socket 30. That is, the steering member can be moved up or down relative to the socket. FIG. 3 illustrates the steering member 34 in raised condition with the distal end 32 thereof raised clear of the caster socket 30. A coil compression spring 52 continuously biases the steering member in a downward direction, the spring being connected at its lower end to steering member 34 in any desired fashion and extending upwardly into engagement with that portion of seat frame 38 slidably and rotatably accommodating the steering member just below the handle 36. That particular portion of the seat frame 38 is designated by reference numeral 54 and it is pivotally mounted relative to seat frame member 38. The ability of the steering member to be brought out of engagement with the caster swivel frame enables the steering member to be rotated and the handle thereof disposed outwardly as shown in the drawings or turned one hundred eighty degrees and positioned in front of the chair's occupant. Furthermore, it is to be noted that the seat frame has a plurality of openings formed in various seat frame members. These allow the seat frame size to be adjusted or varied as desired to accommodate different sized wheelchair users. The ability of the steering member 34 to slide axially enables it to be in engagement with its associated caster swivel frame despite changes in chair height. The length of the steering member itself may also be adjusted since it incorporates a telescopic segment 54 (FIG. 2) which may be fixed in extended or retracted condition.

The support frame 10 includes a slider track 56 which is positioned between the support frame front end and the support frame back end. The bottom or lower end of seat frame member 40 is in the form of a guide member or element 58 which is slidably mounted in the slider track. The guide member 58 is at its forwardmost position (shown for example in FIGS. 1 and 2) when the seat frame is in its uncollapsed condition or condition of use. Movement of the guide member 58 rearwardly enables one to pivot the seat frame about its rearmost pivotal connection with the support frame, where seat frame member 42 is pivoted at the lower end thereof, and the seat frame manipulated to its collapsed condition. Of course, the distal end 32 of steering member 34 must be removed from its associated socket as shown in FIG. 3 to allow this action. A pivoted spring biased latch 59 is employed to maintain the guide member 58 locked in its forwardmost position to maintain the seat frame erect until it is manually released. In FIG. 3 arrows indicate a release force being applied to latch 59 and the guide member moving rearwardly.

The wheelchair includes drive wheels 60, 62 disposed on opposed sides of support frame 10. The drive wheels are mounted on an axle 64 projecting through the support frame. Within interior 16 of support frame or housing 10, axle 64 is connected to a sprocket wheel 66 disposed within the interior. See FIG. 14. An endless chain 68 is disposed about the sprocket wheel and also about a sprocket wheel 70 at the front end of the support frame.

Sprocket wheel 70 is affixed to a drive shaft 72 rotatably mounted in support frame 10 and rotated by means of two pedals 74. Thus, rotation of drive shaft 72 by pedals 74 will cause rotation of sprocket wheel 70 which in turn rotates chain 68 and sprocket wheel 66. Axle 64 and drive wheels 60, 62 are then rotated. Preferably, the mechanism just described incorporates a roller clutch bearing at a suitable location, such as one or more of the drive wheels, to enable the chair to move forward without rotation of the pedals taking place. Roller clutch bearing constructions are well known, being employed for example in bicycles, and need not be described herein.

A tensioner mechanism 76 (FIG. 14) is located within the interior 16. In the arrangement shown, the tensioner 76 includes a pivotally mounted tensioner body 78 having two freely rotatable sprocket wheels 80 mounted thereon and engaging the lower run of the chain 68. A spring 84 biases the tensioner body and sprocket wheels for rotation about pivot point 82 to exert a continuous force on the chain. Without the chain tensioner the application of power to the chain would cause it to stretch and possibly impact against the inside of the support frame 10 causing noise and possible damage.

Figure 13:
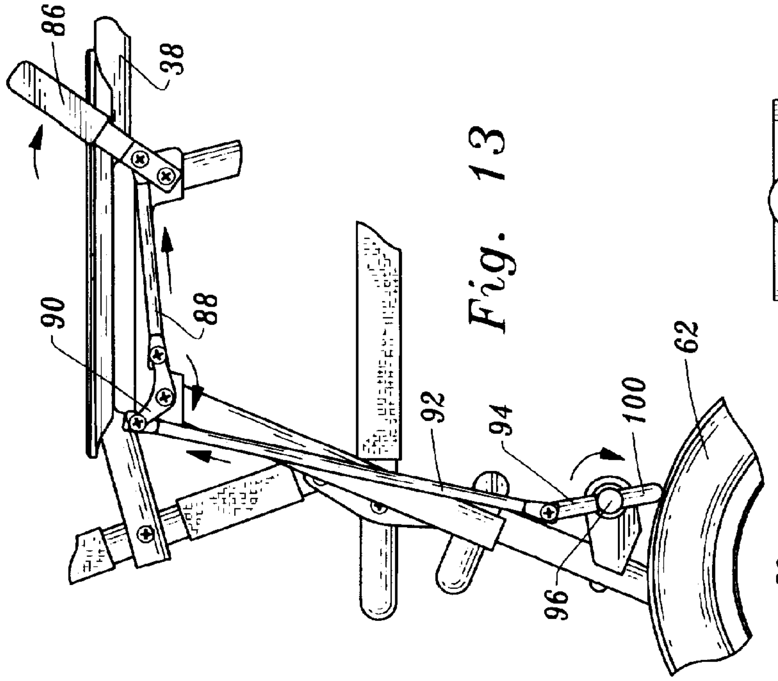
FIG. 13 is a view similar to FIG. 12 but illustrating the braking system in actuated or locking condition.
Figure 12:
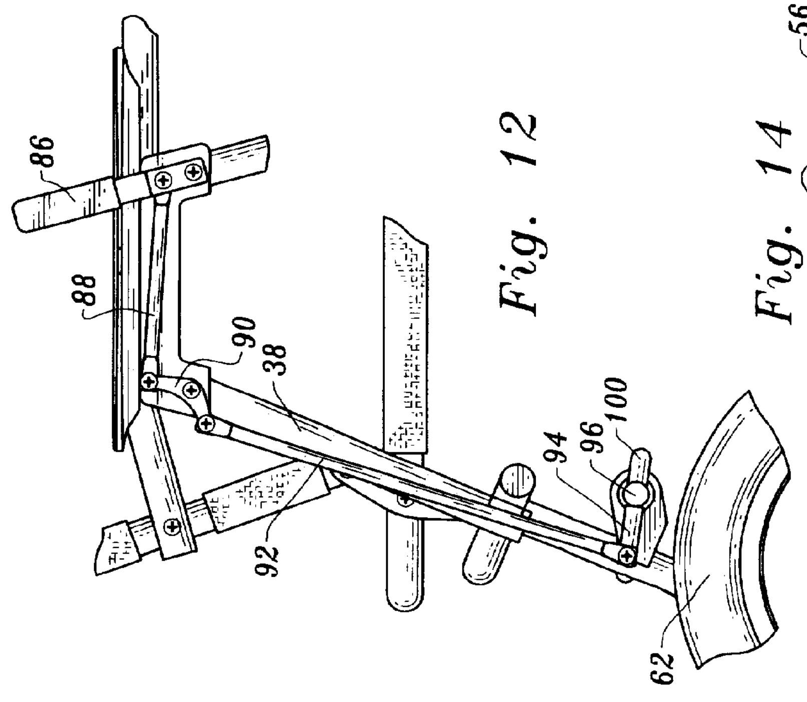
FIG. 12 is a partial side view illustrating the braking system employed in the wheelchair with the brake and related structure being in the positions assumed thereby when the braking system is not actuated.
Figure 14:
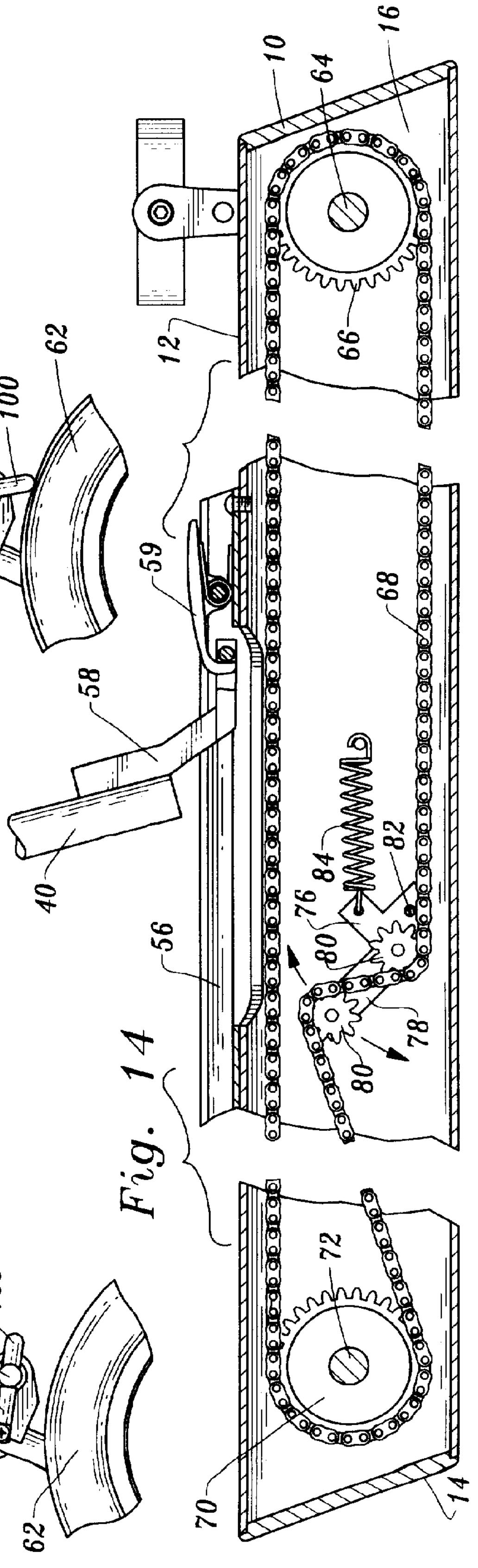
FIG. 14 is a cross-sectional side view illustrating the interior of the wheelchair support frame and drive mechanism including an endless chain disposed within the interior thereof.

Pivotally mounted on seat frame 38 is a lever 86 which is movable between the two positions illustrated in FIGS. 12 and 13.

Connected to lever 86 is a link member 88 pivotally connected at its other end to a rocker member 90 pivotally attached to the seat frame. A link member 92 extends downwardly from the rocker member and connects at the other end thereof to a crank member 94.

Crank member 94 is affixed to a rotatable shaft 96 extending between the two spaced downwardly extending arms 98 of seat frame member 42. Brake elements 100 are attached to shaft 96 at two spaced locations thereon corresponding to the locations of drive wheels 60, 62. Movement of the brake lever 86 from the position shown in FIG. 12 to the position shown in FIG. 13 will cause the various elements of the linkage to move in the directions indicated by the arrows in FIG. 13 and bring both of the brake elements 100 into engagement with drive wheels 60, 62 to lock the wheelchair drive wheels against rotation movement.

Figure 15:
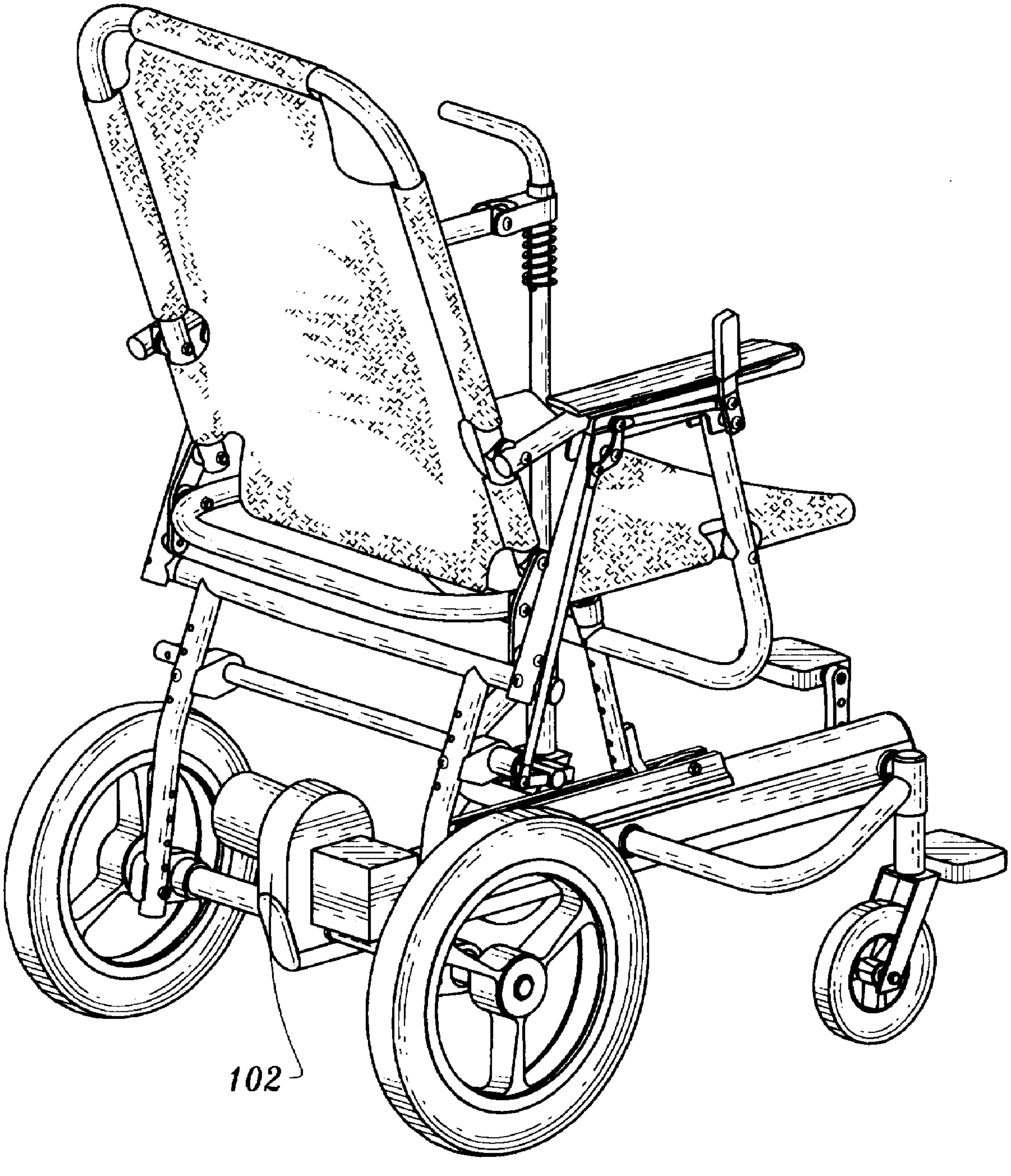
FIG. 15 is a view similar to FIG. 1 but illustrating an alternate embodiment of the invention.

FIG. 15 illustrates an embodiment of the invention wherein a battery powered electric motor 102 is added to the wheelchair to provide yet another alternate form of propulsion.

What is claimed is:

1. A wheelchair comprising, in combination:

a support frame having a support frame front end and a support frame back end;

first and second drive wheels rotatably mounted on said support frame at the support frame back end, said first and second drive wheels being disposed on opposed sides of said support frame;

pedal means mounted on said support frame at the support frame front end;

transmission means operatively associated with said pedal means and said drive wheels for rotating said drive wheels to propel the wheelchair in response to movement of said pedal means by a user of said wheelchair;

caster mounting means connected to said support frame;

first and second caster swivel frames rotatably connected to said caster mounting means, said first and second caster swivel frames being disposed on opposed sides of said support frame and each rotatable three hundred sixty degrees about a vertical axis of rotation relative thereto;

first and second caster wheels, said first caster wheel rotatably mounted on said first caster swivel frame about a horizontal axis and said second caster wheel rotatably mounted on said second caster swivel frame about a horizontal axis;

a steering member rotatably mounted relative to said caster mounting means and connected to said first caster swivel frame to steer the first caster swivel frame along with the caster wheel rotatably mounted thereon when a force is applied to the steering member by said user, and said steering member being freely rotatable three hundred sixty degrees with the first caster swivel frame when a force is not being applied to the steering member by said user; and connector means releasably interconnecting said first caster swivel frame and said steering member, said steering member including an elongated portion having a distal end positioned in said caster mounting means and said connector means including socket means releasably interconnecting the distal end of the elongated portion to the first caster swivel frame.

2. The wheelchair according to claim 1 wherein said second caster swivel frame is responsive to steering of said first caster swivel frame by said steering member to rotate about the vertical axis of rotation thereof.

3. The wheelchair according to claim 5 wherein said socket means comprises a socket hole defined by said first caster swivel frame for receiving the distal end of said elongated portion.

4. The wheelchair according to claim 6 wherein the distal end of said elongated portion is selectively positionable in a plurality of orientations relative to said socket to selectively modify the position of said handle member relative to said first caster swivel frame.

5. The wheelchair according to claim 3 additionally including biasing means continuously biasing the steering member so that the distal end of said elongated portion is urged toward said first caster swivel frame.

6. The wheelchair according to claim 1 wherein said caster mounting means comprises a first caster mounting member and a second caster mounting member, said first and second caster mounting members being disposed on opposed sides of said support frame between said support frame front end and said support frame back end, said first and second caster mounting members forming foot rests spaced from said pedal means and engageable by the feet of said user.

7. The wheelchair according to claim 1 wherein said transmission means includes a drive element forming a continuous loop.

8. The wheelchair according to claim 7 wherein said support frame comprises a housing having an interior accommodating said drive element.

9. The wheelchair according to claim 8 additionally comprising tensioner means within the interior of said housing for applying tension to said drive element.

10. The wheelchair according to claim 1 additionally comprising a seat frame connected to said support frame, said steering member being slidably mounted on said seat frame.

11. The wheelchair according to claim 1 additionally comprising a collapsible seat frame connected to said support frame and selectively movable between a collapsed position and an uncollapsed position.

12. The wheelchair according to claim 9 wherein said drive element comprises a chain forming a continuous loop.

13. The wheelchair according to claim 1 wherein said pedal means comprises a plurality of pedals rotatably mounted on said support frame.

14. The wheelchair according to claim 1 additionally comprising brake means including a first brake element for braking engagement with said first drive wheel and a second brake element for braking engagement with said second drive wheel and brake actuator means for substantially simultaneously bringing said first brake element into braking engagement with said first drive wheel and said second brake element into braking engagement with said second drive wheel.

15. The wheelchair according to claim 14 wherein said brake actuator means comprises a single manually movable lever and mechanical linkage extending between said single manually movable lever and said first and second brake elements.

16. The wheelchair according to claim 10 additionally comprising adjustment means for adjusting the height of said seat frame relative to said support frame, said steering member being slidable relative to said first swivel caster frame and maintained in connection with said first caster swivel frame for any adjusted height of said seat frame.

17. A wheelchair comprising, in combination:

a support frame having a support frame front end and a support frame back end;

first and second drive wheels rotatably mounted on said support frame at the support frame back end, said first and second drive wheels being disposed on opposed sides of said support frame;

pedal means mounted on said support frame at the support frame front end;

transmission means operatively associated with said pedal means and said drive wheels for rotating said drive wheels to propel the wheelchair in response to movement of said pedal means by a user of said wheelchair;

caster mounting means connected to said support frame;

first and second caster swivel frames rotatably connected to said caster mounting means, said first and second caster swivel frames being disposed on opposed sides of said support frame and each rotatable three hundred sixty degrees about a vertical axis of rotation relative thereto;

first and second caster wheels, said first caster wheel rotatably mounted on said first caster swivel frame about a horizontal axis and said second caster wheel rotatably mounted on said second caster swivel frame about a horizontal axis;

a collapsible seat frame connected to said support frame and selectively movable between a collapsed position and an uncollapsed position; and latch means operatively associated with said collapsible seat frame and said support frame to latch said collapsible seat frame in said uncollapsed position, said support frame including a slider track positioned between the support frame front end and the support frame back end, said collapsible seat frame being pivotally connected to said support frame at a pivot location on said collapsible seat frame and including a guide member spaced from said pivot location and slidably mounted in said slider track.

18. A wheelchair comprising, in combination:

a support frame having a support frame front end and a support frame back end;

first and second drive wheels rotatably mounted on said support frame at the support frame back end, said first and second drive wheels being disposed on opposed sides of said support frame;

pedal means mounted on said support frame at the support frame front end;

transmission means operatively associated with said pedal means and said drive wheels for rotating said drive wheels to propel the wheelchair in response to movement of said pedal means by a user of said wheelchair;

caster mounting means connected to said support frame;

first and second caster swivel frames rotatably connected to said caster mounting means, said first and second caster swivel frames being disposed on opposed sides of said support frame and each rotatable three hundred sixty degrees about a vertical axis of rotation relative thereto;

first and second caster wheels, said first caster wheel rotatably mounted on said first caster swivel frame about a horizontal axis and said second caster wheel rotatably mounted on said second caster swivel frame about a horizontal axis;

a steering member rotatably mounted relative to said caster mounting means and connected to said first caster swivel frame to steer the first caster swivel frame along with the caster wheel rotatably mounted thereon when a force is applied to the steering member by said user, and said steering member being freely rotatable three hundred sixty degrees with the first caster swivel frame when a force is not being applied to the steering member by said user;

a collapsible seat frame connected to said support frame and selectively movable between a collapsed position and an uncollapsed position; and latch means operatively associated with said collapsible seat frame and said support frame to latch said collapsible seat frame in said uncollapsed position.

19. The wheelchair according to claim 18 wherein said support frame includes a slider track positioned between the support frame front end and the support frame back end, said collapsible seat frame being pivotally connected to said support frame at a pivot location on said collapsible seat frame and including a guide member spaced from said pivot location and slidably mounted in said slider track.

* * * * *